US012675265B2

(12) United States Patent
Weber

(10) Patent No.: US 12,675,265 B2
(45) Date of Patent: Jul. 7, 2026

(54) DYNAMIC PATHWAYS FOR ARTIFICIAL INTELLIGENCE AND TENSOR COMPUTATION GRAPHS

(71) Applicant: NEC Laboratories Europe GmbH, Heidelberg (DE)

(72) Inventor: Nicolas Weber, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 272 days.

(21) Appl. No.: 18/476,349

(22) Filed: Sep. 28, 2023

(65) Prior Publication Data

US 2025/0045029 A1 Feb. 6, 2025

Related U.S. Application Data

(60) Provisional application No. 63/530,480, filed on Aug. 3, 2023.

(51) Int. Cl.
*G06F 8/41* (2018.01)
(52) U.S. Cl.
CPC ..................................... *G06F 8/433* (2013.01)
(58) Field of Classification Search
CPC ....................................................... G06F 8/433
See application file for complete search history.

(56) References Cited

U.S. PATENT DOCUMENTS

| | | | |
|---|---|---|---|
| 9,471,377 B2 | 10/2016 | Baskaran et al. | |
| 9,798,527 B1 * | 10/2017 | Bendersky | .............. G06F 8/443 |

| | | | |
|---|---|---|---|
| 10,366,322 B2 | 7/2019 | David et al. | |
| 10,963,787 B2 | 3/2021 | Zlateski et al. | |
| 11,314,515 B2 | 4/2022 | Pal et al. | |
| 11,636,343 B2 | 4/2023 | Alistarh | |
| 2019/0278574 A1 * | 9/2019 | Ravishankar | ....... G06F 16/9024 |

(Continued)

FOREIGN PATENT DOCUMENTS

| | | |
|---|---|---|
| CN | 110263923 A | 9/2019 |
| CN | 109857744 B | 3/2020 |

(Continued)

OTHER PUBLICATIONS

NPL_CN 112527304 A_Adaptive Node Fusion Compiling Optimization (Year: 2021).*

(Continued)

*Primary Examiner* — Ziaul A Chowdhury
(74) *Attorney, Agent, or Firm* — Leydig, Voit & Mayer, Ltd.

(57) ABSTRACT

A method for optimizing control flow in compiled computation graphs includes defining an intermediate representation (IR) of a computation graph, the computation graph IR including a main computation graph having at least one control flow primitive layer node pointing to one or more control flow sub-graph nodes. Fusable layer nodes of the main computation graph are identified and removed from the main computation graph, and the removed fusable layer nodes are duplicated into each of the one or more control flow sub-graph nodes. The method can be applied to machine learning (ML) and artificial intelligence (AI) frameworks, for example, to support decision making and optimization of targets and scientific computations in a variety of applications such as in medical/healthcare (e.g., AI assisted healthcare or drug development).

19 Claims, 8 Drawing Sheets

(56) References Cited

U.S. PATENT DOCUMENTS

| | | | | |
|---|---|---|---|---|
| 2020/0279349 | A1 | 9/2020 | Nurvitadhi et al. | |
| 2023/0161997 | A1 | 5/2023 | Baum et al. | |
| 2024/0127027 | A1* | 4/2024 | Wang | G06N 3/045 |

FOREIGN PATENT DOCUMENTS

| | | | | |
|---|---|---|---|---|
| CN | 111966401 | A | 11/2020 | |
| CN | 112527304 | A * | 3/2021 | G06F 18/25 |
| CN | 115859016 | A | 3/2023 | |
| EP | 4177731 | A1 | 5/2023 | |
| KR | 102508635 | B1 | 3/2023 | |

OTHER PUBLICATIONS

Christopher Daniel Leary et al. "LLVM Fusing Kernel Compiler Design", pp. 1-11, [Retrieved from Interent on Feb. 7, 2026],<https://www.tdcommons.org/cgi/viewcontent.cgi?article=1624&context=dpubs_series> (Year: 2017).*

Ayman, Omar; "Dynamic vs Static Computational Graphs [PyTorch or TensorFlow]"; *TechQualia*; Feb. 5, 2020; pp. 1-3; [Online] Retrieved from Internet: https://www.synapse-analytics.io/post/dynamic-vs-static-computational-graphs-pytorch-or-tensorflow; Synapse Analytics; Cairo, Al Qahirah, Egypt.

Bik, Aart et al.; "Compiler Support for Sparse Tensor Computations in MLIR"; *ACM Transactions on Architecture and Code Optimization*; Sep. 16, 2022; pp. 1-25; vol. 19, No. 4, Art. 50; ACM Publications; New York, NY, USA.

Chen, Simin et al.; "DyCL: Dynamic Neural Network Compilation Via Program Rewriting and Graph Optimization"; *Proceedings of the 32nd ACM SIGSOFT International Symposium on Software Testing and Analysis*; Jul. 13, 2023; pp. 614-626; ACM Publications; New York, NY, USA.

Chou, Stephen et al.; "Compilation of Dynamic Sparse Tensor Algebra"; *Proceedings of the ACM on Programming Languages*; Oct. 31, 2022; pp. 1408-1437; vol. 6, No. OOPSLA2, Art. 175; ACM Publications; New York, NY, USA.

Dima, Alexandra; "Gstaco: A Generalized Sparse Tensor Algebra Compiler"; *Department of Electrical Engineering and Computer Science—Master of Engineering in Electrical Engineering and Computer Science*; Jan. 20, 2023; pp. 1-74; Massachusetts Institute of Technology; Cambridge, MA, USA.

Mohammadi, Milad et al.; "PyTorch & OpenXLA: The Path Forward"; PyTorch & OpenXLA Blog; Apr. 3, 2023; pp. 1-3; [Online] Retrieved from Internet: https://pytorch.org/blog/pytorch-2.0-xla-path-forward/; PyTorch, Meta Platforms Inc.; New York, NY, USA.

Raiman, Jonathan; "Dali: Lazy Compilation of Dynamic Computation Graphs"; *Workshop on Systems for ML at 33rd Conference on Neural Information Processing Systems*; Dec. 8, 2019; pp. 1-7; Preprint; Curran Associates, Inc.; Red Hook, NY, USA.

Rao, Gengyu et al.; "SparseCore: Stream ISA and Processor Specialization for Sparse Computation"; *Proceedings of the 27th ACM International Conference on Architectural Support for Programming Languages and Operating Systems*; Feb. 22, 2022; pp. 186-199; ACM Publications; New York, NY, USA.

Shen, Haichen et al.; "Nimble: Efficiently Compiling Dynamic Neural Networks for Model Inference"; *Proceedings of the 4th Machine Learning and Systems Conference*; Mar. 12, 2021; pp. 1-15; vol. 2; ArXiv.org, Cornell University; Ithaca, NY, USA.

Tan, Shangyin et al.; "SpAlpa: Automating Distributed Deep Learning for Sparse Neural Networks"; *Department of Electrical Engineering and Computer Science—Course CS262a: Advanced Topics in Computer Systems*; Dec. 12, 2022; pp. 1-11; vol. 1; Project No. 4; University of California; Berkeley, CA, USA.

Wen, William; "Torch.compile Tutorial"; *PyTorch Tutorials*; Mar. 27, 2023; pp. 1-11; [Online] Retrieved from Internet: https://pytorch.org/tutorials/intermediate/torch_compile_tutorial.html; PyTorch, Meta Platforms Inc.; New York, NY, USA.

Yu, Yuan et al.; "Dynamic Control Flow in Large-Scale Machine Learning"; *EuroSys '18: Proceedings of the 13th EuroSys Conference*; Apr. 23, 2018; pp. 1-15; Art. 18; ACM Publications; New York, NY, USA.

* cited by examiner

DYNAMIC PATHWAYS FOR ARTIFICIAL INTELLIGENCE AND TENSOR COMPUTATION GRAPHS

CROSS-REFERENCES TO RELATED APPLICATIONS

The present application claims priority to U.S. Provisional Patent Application No. 63/530,480, filed Aug. 3, 2023, which is hereby incorporated by reference herein.

FIELD

The present invention relates to artificial intelligence (AI) and machine learning (ML), and in particular to a method, system, computer-readable medium and computer program product for dynamic control in tensor computation graphs.

BACKGROUND

Many computations in science and artificial intelligence (AI) are based on tensor computation graphs. These are usually modeled as static graphs. In recent years, there has been some effort to add dynamism into these graphs, such as very basic if true/false blocks, simple counting loops or dynamic dimensions. However, especially in today's optimizing compilers, support for these simple dynamic primitives is very limited.

SUMMARY

An embodiment of the present invention provides a method for optimizing control flow in compiled computation graphs. The method comprises defining an intermediate representation (IR) of a computation graph, the computation graph IR including a main computation graph having at least one control flow primitive layer node pointing to one or more control flow sub-graph nodes, identifying fusable layer nodes of the main computation graph, and removing the fusable layer nodes from the main computation graph and duplicating the removed fusable layer nodes into each of the one or more control flow sub-graph nodes. The method can be applied to machine learning and artificial intelligence (AI) frameworks, for example, to support decision-making and optimization of targets and scientific computations in a variety of applications such as in medical/healthcare (e.g., AI assisted healthcare or drug development).

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
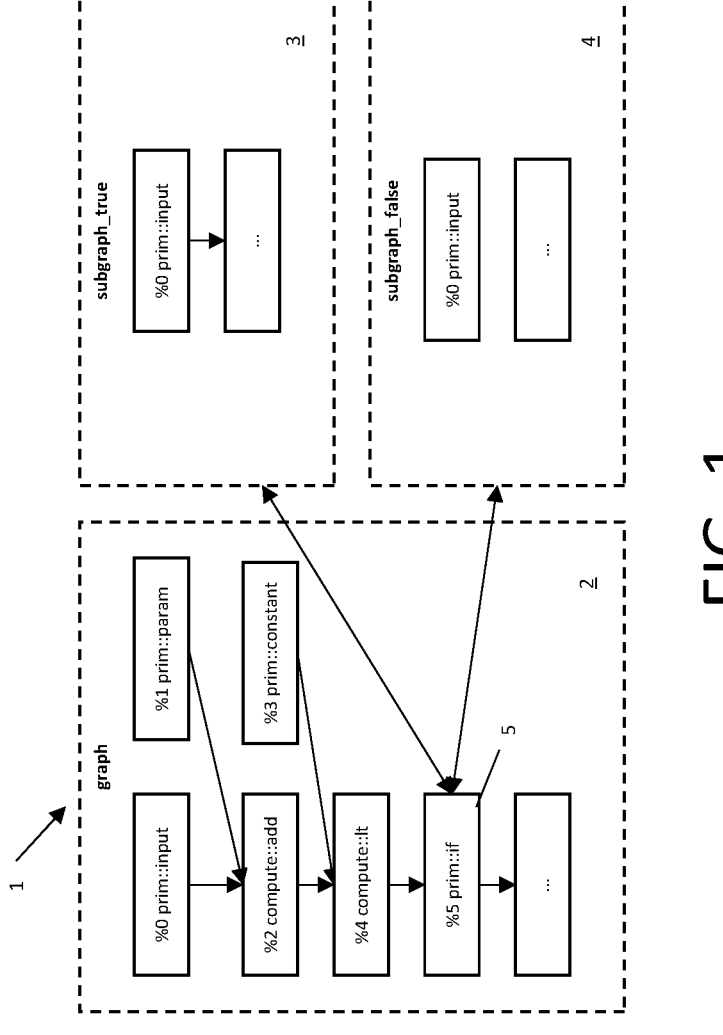
FIG. 1 illustrates an example of a conditional If-statement construct within a tensor computation graph.

Embodiments of the present invention provide a system, method and computer-readable medium for optimizing control flow in compiled computation graphs by implementing dynamic control flow primitives in compiled control-plane of compiled AI and tensor computation graphs, and by moving fusable operations that occur before and after control flow primitives into subgraphs, e.g., to enable normal compiler layer fusion algorithms. Certain embodiments implement copying of computation results into the control-plane's memory, and provide for early termination paths, e.g., for empty tensors. The embodiments herein advantageously allow for reducing the computations and execution time, and hence use of resources, when compiling and processing compiled computation graphs.

AI compute pipelines or scientific computations that rely on tensor computations and make use of gradient computations have the technical problem that, depending on the execution mode (inference, training) or computation of $1^{st}$, $2^{nd}$, $3^{rd}$, . . . , derivative, and which model parameters or inputs require gradients, parts of the computation graph do not need to be executed. A simple example is referred to as batch normalization. During training, the normalization parameters get updated, before these get applied to the data. In inference, these parameters don't get updated, and the normalization gets directly applied. For example:

```
def batchnorm(input, mean, var, weight,
bias, eps, omentum, axis, training):
    if training: [# dynamic path]
        mean, var = batchnormUpdate(input,
        mean, var, eps, momentum, axis)
    return batchnormInference(input, mean,
    var, weight, bias, axis);
```

Other examples are copies of data that need to be created during the forward pass, which are required to compute gradients in the backward pass. A simple example is 'C=max (A, B)' where the gradients are defined as 'dA=A>B?dC: 0' and 'dB=A>B?0: dC'.

Another example are dynamic tensor shapes. Operations such as 'tf.Where( . . . )' can return empty Tensors (where one dimension is 0). Still, these frameworks launch all consecutive function calls, even if they will not process any data. For example:

```
x = tf.Where(input, condition) # returns empty Tensor
if x.numel == 0: [# dynamic path]
    return tf.empty(x.shape, x.dtype)
...
return x
```

Before describing in more detail embodiments of the present invention, a short overview of existing AI technology (e.g., PyTorch or TensorFlow) and tensor compute frameworks (e.g. JAX), that support different execution modes, is provided in the following.

Eager Mode: If the model gets executed eagerly, the frameworks dynamically check if parameters need to be updated, or copies need to be created. While this is the most dynamic mode, it's also the slowest. For example, it is the PyTorch default execution mode.

Compilation Mode: In compilation mode, the computation graph gets compiled towards a specific configuration. A specialized compiled version is created for every execution mode (inference, training forward and training backward), executing device (central processing unit (CPU), graphics processing unit (GPU), Vector Processor, or other kind of computational device), different input shapes (if dynamic shapes are not supported or not wanted for performance reasons), or input/output requirements (e.g., required gradients). However, whenever the user changes any of these parameters it requires gradients, and the entire computation graph needs to be recompiled using the provided configuration. This compilation can take from several minutes up to hours, depending on the complexity of the computation graph. Tools such as TVM by Apache with exhaustive auto tuning, could even take up several days, due to the exhaustive auto-tuning that they perform. This is one of the reasons why TVM was never intended for use in training pipelines. Other examples are 'torch.compile( . . . )' or 'keras.Model-.compile( . . . jit_compile=True)', which are much faster than the TVM compilation, and can support training, but usually do not achieve TVM's performance.

Graph Mode: Graph mode is an intermediate variant of both methods. It translates the computation graph into an easier to execute intermediate representation (IR), which improves performance while keeping a limited amount of dynamism. Usually, this mode allows to have diverging code paths using While-Loops or If-statements. Examples are 'torch.jit.script( . . . )', 'keras. Mode.compile( . . . jit_compile=False)' or 'tf.function( . . . )'.

The eager and compiled modes are the two extremes, with eager mode to be fully dynamic executing the user script code in every iteration, and compilation mode being a compiled fixed function implementation that does not allow any dynamism, but provides peak performance. An exception is that some modern AI/Tensor compilers allow dynamic dimensions. Still for many (e.g., 'torch. compile( . . . )') dynamic dimensions are still a beta feature and not well supported. Omar Ayman, "Dynamic vs Static Computational Graphs [PyTorch or TensorFlow]," Synapse Analytics, <<https://www.synapse-analytics.io/post/dynamic-vs-static-computational-graphs-pytorch-or-tensorflow>> (Jun. 24, 2021), which is hereby incorporated by reference herein, discusses differences between eager and graph modes.

Aspect (1): According to a first aspect, the present invention provides a method for optimizing control flow in compiled computation graphs. The method comprises defining an intermediate representation (IR) of a computation graph, the computation graph IR including a main computation graph having at least one control flow primitive layer node pointing to one or more control flow sub-graph nodes, identifying fusable layer nodes of the main computation graph, and removing the fusable layer nodes from the main computation graph and duplicating the removed fusable layer nodes into each of the one or more control flow sub-graph nodes.

Aspect (2): In aspect (2), the present invention provides the method according to aspect (1), wherein layer nodes of the computation graph IR define code paths, and wherein the method further comprises, during runtime: detecting one or more code paths that depend on one or more parameters that may change, and enabling or disabling executing the one or more code paths based on the one or more parameters having changed during runtime.

Aspect (3): In aspect (3), the present invention provides the method according to aspects (1) or (2), wherein the aspect further comprises copying to a memory a computation result of a layer node of the main computation graph executed prior to the at least one control flow primitive layer node.

Aspect (4): In aspect (4), the present invention provides the method according to aspects (1) or (2) or (3), wherein only a layer node that receives data or calls for data is configured to allocate or free memory for the data and for variables.

Aspect (5): In aspect (5), the present invention provides the method according to aspects (1), (2), (3) or (4), wherein each control flow sub-graph node is allowed to only allocate memory for itself.

Aspect (6): In aspect (6), the present invention provides the method according to aspects (1), (2), (3), (4) or (5), wherein the aspect further comprises adding a termination path sub-graph node that provides for all model outputs of the termination path sub-graph to be allocated and/or zeroed out, wherein the termination path sub-graph is executed at runtime in response to a zero-element tensor.

Aspect (7): In aspect (7), the present invention provides the method according to aspects (1), (2), (3), (4), (5) or (6), wherein the fusible layer nodes comprise operations that occur before and/or after execution of the at least one control flow primitive layer node.

Aspect (8): In aspect (8), the present invention provides the method according to aspects (1), (2), (3), (4), (5), (6) or (7), wherein the defining the IR of the computation graph includes receiving the computation graph and processing the computation graph to produce the IR of the computation graph.

Aspect (9): In aspect (9), the present invention provides the method according to aspects (1), (2), (3), (4), (5), (6), (7) or (8), wherein the at least one control flow primitive layer node comprises a conditional construct.

Aspect (10): In aspect (10), the present invention provides the method according to aspects (1), (2), (3), (4), (5), (6), (7), (8) or (9), wherein the conditional construct comprises a While construct or an If construct or a loop construct.

Aspect (11): In an aspect (11), the present invention provides a system for optimizing control flow in compiled computation graphs, the system comprising one or more hardware processors which, alone or in combination, are configured to provide for execution of the following steps: (a) defining an intermediate representation (IR) of a computation graph, the computation graph IR including a main computation graph having at least one control flow primitive layer node pointing to one or more control flow sub-graph nodes, (b) identifying fusable layer nodes of the main computation graph, and (c) removing the fusable layer nodes from the main computation graph and duplicating the removed fusable layer nodes into each of the one or more control flow sub-graph nodes.

Aspect (12): In aspect (12), the present invention provides the system according to aspect (11), wherein the steps further include adding a termination path sub-graph node that provides for all model outputs of the termination path sub-graph to be allocated and/or zeroed out, wherein the termination path sub-graph is executed at runtime in response to a zero-element tensor.

Aspect (13): In aspect (13), the present invention provides the system according to aspects (11) or (12), wherein the steps further include copying to a memory a computation result of a layer node of the main computation graph executed prior to the at least one control flow primitive layer node.

Aspect (14): In aspect (14), the present invention provides the system according to aspects (11), (12) or (13), wherein layer nodes of the computation graph IR define code paths, and wherein the steps further include, during runtime: detecting one or more code paths that depend on one or more parameters that may change, and enabling or disabling executing the one or more code paths based on the one or more parameters having changed during runtime.

Aspect (15): In an aspect (15), the present invention provides a tangible, non-transitory computer-readable medium having instructions thereon which, upon being executed by one or more hardware processors, alone or in combination, provide for execution of the following steps: (a) defining an intermediate representation (IR) of a computation graph, the computation graph IR including a main computation graph having at least one control flow primitive layer node pointing to one or more control flow sub-graph nodes, (b) identifying fusable layer nodes of the main computation graph, and (c) removing the fusable layer nodes from the main computation graph and duplicating the removed fusable layer nodes into each of the one or more control flow sub-graph nodes.

Embodiments of the present invention provide to improve existing technology to provide for improved dynamic execution of compiled AI/Tensor computation graphs.

Embodiments of the present invention rely on a "Graph-Mode"-like intermediate representation (IR) that supports conditional constructs such as While and If constructs. This is already supported by Graph-IRs such as TensorFlow-Graph or TorchScript. In an embodiment, a computation graph IR is formed from a computation graph, and in particular the process forms the main graph and sub-graphs from an original computation graph. For example, given a Python program e.g.:

```
if(condition):
    do_something( )
else:
    do_something_else ( )
``` an AST parser may be used to parse that code: any fixed-function instructions (e.g., +, −, *, /, Poolings, Convolutions, Matrix Multiplications, Activations, Normalization, . . . ) are added as nodes within the main-graph. When the parser sees the "if"-node it will put a node into the main graph, something like '%if (%condition, %do_something, %do_something_else)', and the parser will create a subgraph for 'do_something' and a subgraph for 'do_something_else'. In each of the subgraphs, the AST parser will again go through the respective code of these functions.

Usually, primitives are implemented as sub-graphs. For example:

%0=prim::input("input_data", float32, [*, *, 3, 7])// unique_name, dtype, shape
%1=prim::param("some_parameter", float32, [1, 1, 3, 7])
%2=compute::add(%0, %1)

%3=prim::constant(1.0, float32)
%4=compute::lt(%2, %3)
%5=prim::if(%4, %subgraph_true, %subgraph_false)
This is the corresponding Python code:

```
def func(input_data):
    X = input_data + self.some_parameter
    if x < 1.0:
        subgraph_true( )
    else:
        subgraph_false( )
This example takes a user-provided input
('input_data') and a model parameter
'self.some_parameter', and adds them
together. If this is smaller than 1.0, then
'subgraph_true( )' is executed,
otherwise 'subgraph_false( )'.
```

FIG. 1 shows an example computation graph IR 1 implementing the example code, above, according to an embodiment. As shown in this example, the computation graph IR 1 includes a main graph 2 and sub-graphs 3, 4 pointed at by a control flow primitive 5. It is expected that these subgraphs will have the identical input/output (I/O) behavior, so that the same tensors and tensor-shapes are provided for input and output. Also, existing technology in compilers provides for applying optimizations such as layer fusion to IRs, which then can result in simplified representations. For example:

%0=prim::input("input_data", float32, [*, *, 3, 7])// unique_name, dtype, shape
%1=prim::param("some_parameter", float32, [1, 1, 3, 7])
%4=fused_2_3_4 (%0, %1)
%5=prim::if(%4, %subgraph_true, %subgraph_false)
Control-Flow in Compiled Graphs:

When generating the compiled code, it is necessary to distinguish between a control-plane and a computation-plane. A process for distinguishing between the control-plane and the compute-plane depends on the programming model. In CUDA, for example, it is enforced, as the control-plane code runs on the CPU, while the computation-plane code runs on the GPU. Other devices such as NEC SX-Aurora allow to run the control-plane on the CPU or the SX-Aurora itself. It is straight-forward to identify which part of the code is controlling code, that allocates memory, copies data from A to B, and does all the maintenance, while the computation-plane is used for the mathematical operations and calculations. An example for the control-plane that usually gets executed by a CPU in existing compilers is as follows:

```
void graph(const float* _0, const float* _1) {
    bool* _4 = malloc(sizeof(bool) * ...)
    fused_2_3_4(_0, _1, _4);
    ...
}
```

Figure 3:
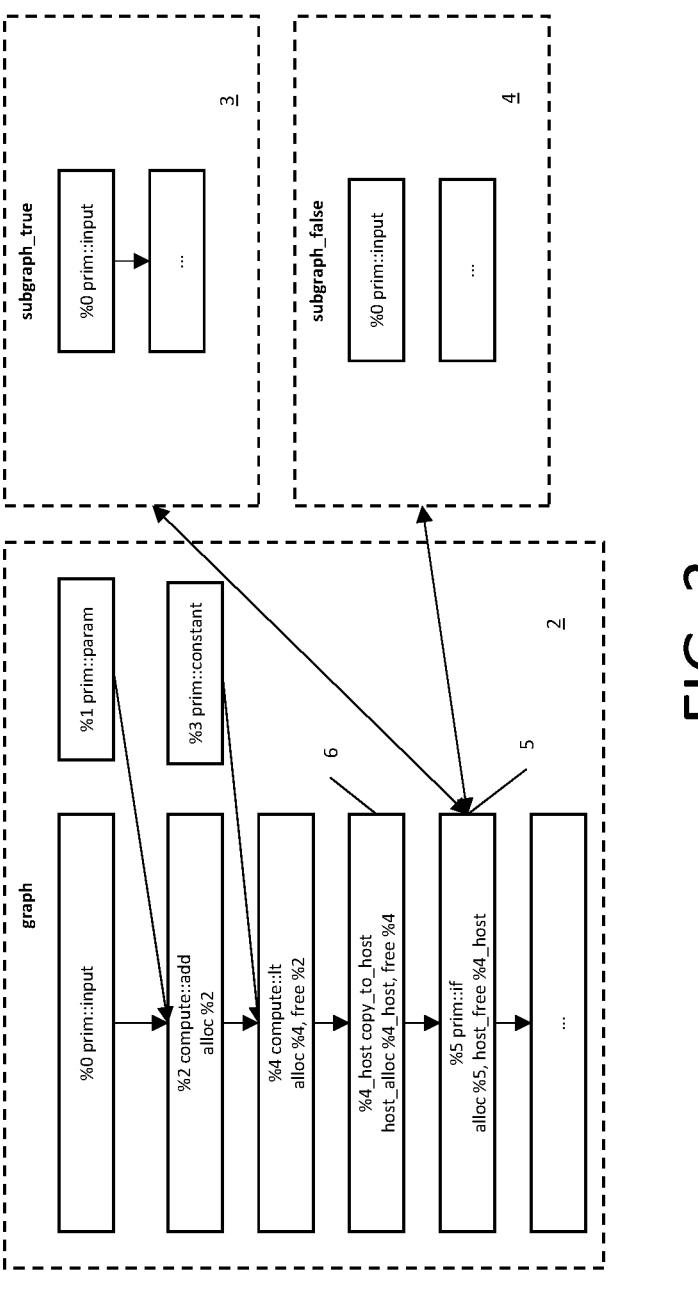
FIG. 3 illustrates a computation graph with (host-) alloc/ free annotations, according to an embodiment.

The above code is related to FIG. 3; the code is doing the same operation previously explained above. To go into more details:

```
_0 is 'input_data'
_1 is 'self.some_parameter'
_4 is allocating the output 'x < 1.0'
``` fused_2_3_4 is the compiler-fused CODE. Pseudocode would look something like this:

```
"""
def fused_2_3_4(input_data, some_parameter)
x = input_data + some_parameter
return x < 1.0
"""
```

This code uses _0 and _1 as input and allocates the output _4. As the intermediate result _3 is fused into the operation 'fused_2_3_4', it does not explicitly get allocated.

Calls to 'prim::if' 5 however are not supported by existing compilers. An exception might be if the expression can be statically evaluated, e.g., '(0<1?5:3)=5'. Embodiments of the present invention provide to improve this control-plane to enable dynamic control flows also in compilers. The improvement can advantageously relatively easily implemented by generating modified code such as:

```
void subgraph_true(...) { ... }
void subgraph_false(...) { ... }
void graph(const float* _0, const float* _1) {
    bool* _4 = malloc(sizeof(bool) * ...)
    fused_2_3_4(_0, _1, _4);
    if(_4[0]) {
        subgraph_true(...);
    } else {
        subgraph_false(...);
    }
}
```

Here, the control-plane (the 'void graph' function) is using the computation-plane result stored in '_4' to either execute 'subgraph_true or 'subgraph_false'. Another way to see this is that 'subgraph_true' and '_false' are both again control-plane functions, which then within can call into other computation-plane functions. Whereas, before, a control-plane function only could call computation-plane functions. Here, advantageously, control-plane functions can call other control-plan functions (the subgraphs), and also copy data between the control- and computation-planes (see below).

The same principle can be applied for While loops, but instead of a single value (%4) it would call another subgraph that evaluates the condition, for example:

```
void graph(const float *_0, const float* _1) {
    bool* _4 = malloc(sizeof(bool) * ...)
    subgraph_cond(_0, _1, _4);
    while(_4[0]) {
        subgraph_exec(_0, _1, ...);
        subgraph_cond(_0, _1, _4);
    }
}
```

Here, 'subgraph_cond' executes the condition evaluation and stores it's result in '_4'. The control-plane function 'graph' keeps executing 'subgraph_exec' as long as 'subgraph_cond' returns 'true'.

It can be seen that the conditional subgraph needs to be reevaluated in every iteration. However, there may be technical problems arising from this approach, which can be overcome with embodiments of the present invention as discussed in the following.
Cross-Device Control-/Computation-Plane Data:

First, the functions 'fused_2_3_4' or 'subgraph_cond' belong to the computation-plane, which is executed by the computational device, that can be the CPU, but usually is any kind of compute accelerator. In order to use the result of these functions, it may be necessary to copy the computation result into the control-plane's memory. For this, embodiments of the present invention use a copy operation, such as the 'copy<src_device, dst_device>(const T*src, T*dst)' operation, which ensures that the computation result(s) are copied over from the executing device to the controlling CPU.

Figure 2:
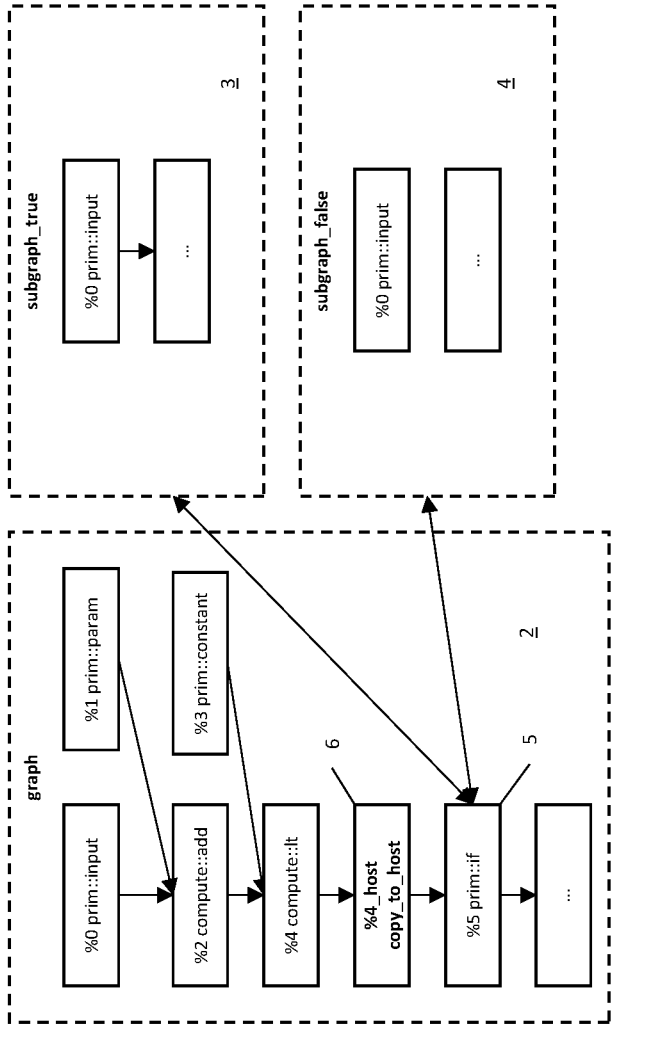
FIG. 2 illustrates an example with a copy_to_host control flow operation according to an embodiment.

FIG. 2 illustrates an example of a control flow layer node 6 added to the main graph 2 that implements a copy_to_host operation according to an embodiment. For this, an example of code to modify the previous examples is as follows:

```
void graph(const float* _0, const float* _1) {
    bool* _4 = malloc(sizeof(bool) * ...)
    fused_2_3_4(_0, _1, _4);
    bool _4_host;
    copy<gpu, cpu>(_4, &_4_host);
    if(_4_host) {
        subgraph_true(...);
    } else {
        subgraph_false(...);
    }
}
``` and

```
void graph(const float* _0, const float* _1) {
    bool* _4 = malloc(sizeof(bool) * ...)
    subgraph_cond(_0, _1, _4);
    bool _4_host;
    copy<gpu, cpu>(_4, &_4_host);
    while(_4_host) {
        subgraph_exec(_0, _1, ...);
        subgraph_cond(_0, _1, _4);
        copy<gpu, cpu>(_4, &_4_host);
    }
}
```

These two examples are identical to the above; the difference is, in the first example (for simplicity) it is assumed that the control-plane and the computation-plane get executed on the same device (e.g. CPU). In these two examples, the control-plane is on the CPU and the computation-plane is on the GPU, so the output '_4' which is a computation-plane variable, needs to be copied into the memory space of the control-plane.

Depending on the application, control flows might depend on other externally defined factors such as the executing device, execution mode (inference/training), enabled/disabled layers, or enabled/disabled gradients. These external factors are accessible from the control-plane.
Memory Allocations:

When calling subgraphs, such as subgraphs 3, 4, the handling of memory allocations can become not transparent. This raises the technical question of whether the calling or called graph should allocate or free memory, which is solved by an embodiment of the present invention with an ownership protocol as follows: "All data that is passed from a calling layer, is owned by this layer and only the owner is allowed to free memory." This means that the calling layer needs to allocate the input data and the output data as it is passed the pointer to the subgraph. Within the subgraph, only this one is allowed to allocate memory for itself. With this ownership protocol, it is possible to assign each operator within the intermediate representation which data tensors and which control flow variables to allocate or free. FIG. 3 shows the allocations/frees for the running example according to an embodiment. Allocation operations are always executed before calling the operation, and frees (free operations) always after. Allocations happen when a layer gets executed. For example, the node '%2' allocates its own output. This output needs to be kept alive as long as all layers that are using it have been executed. '%4' is the last layer to use '%2' as input, so after '%4' has been executed, '%2' can be freed.

In the following, exemplary embodiments of the present invention are further described.

Figure 4:
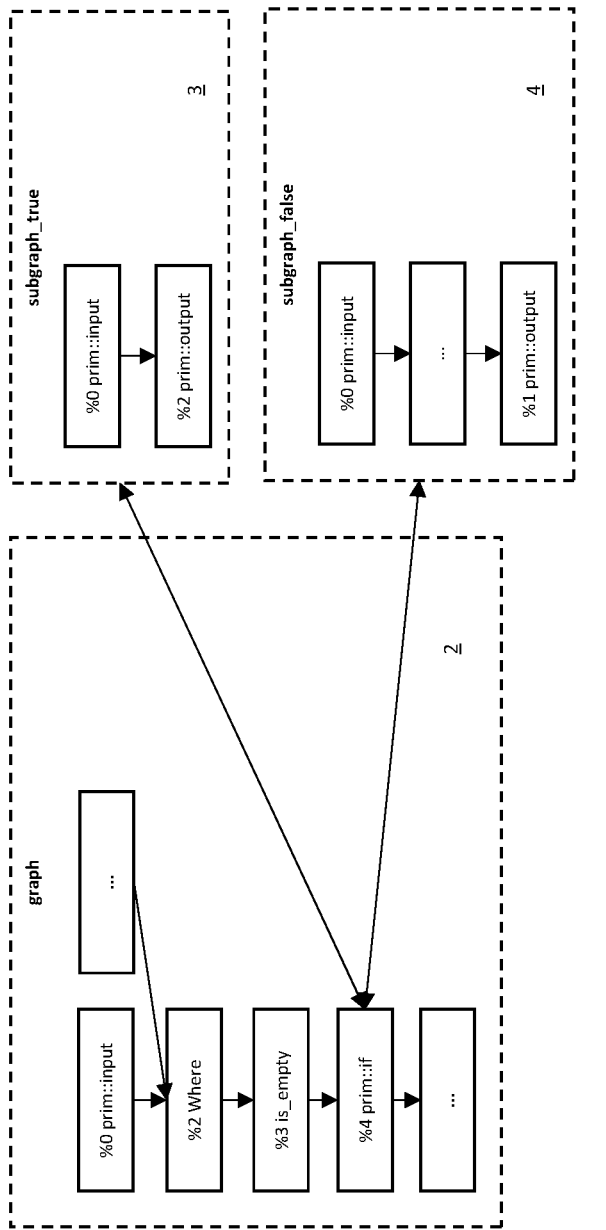
FIG. 4 illustrates an example of tf.Where early termination according to an embodiment.
Figure 5:
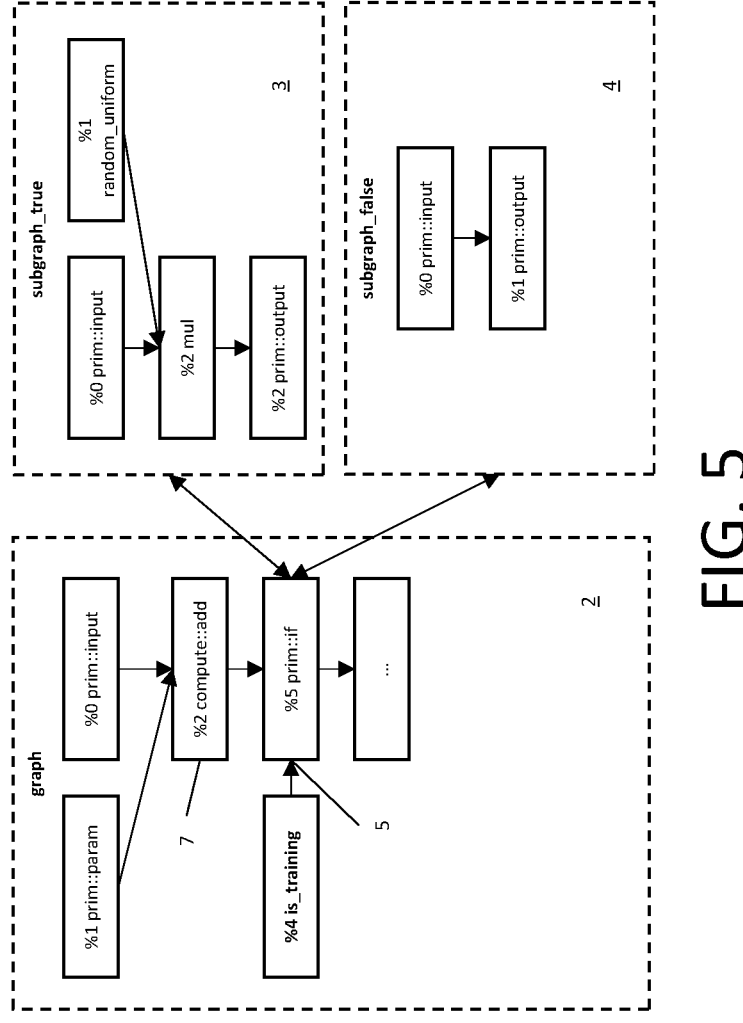
FIG. 5 illustrates an example graph for 'is_training' dependent computation graph according to an embodiment.

Early Termination:

As previously mentioned, when users provide zero-element input tensors or functions such as 'tf.Where', that return empty tensors, the entire remaining computation graph is executed, which will not run any relevant computations, but it still needs to execute all control code, allocate empty tensors (which still might produce some framework overhead), call computation kernels (that don't need to compute anything), etc. However, these cases are easy to detect, as only input, parameter or layers such as 'tf.Where' can provide zero-element tensors to the computation graph. This fact advantageously allows for placing simple checks for early termination into the control-plane. In an embodiment, it is provided for that the early termination ensures that the I/O behavior of the computation graph stays identical, even though it does not get completely executed. This means, that, e.g., execution counters available in PyTorch's BatchNorm layers correctly get increased, or that all model outputs get allocated and, if necessary, get zeroed. FIG. 4 shows an example, where if the tensor %3 is empty, %4 will execute subgraph_true, which is a no-op, else it will execute all consecutive operations on that tensor. FIG. 5 shows the dynamic graph for a Dropout layer, according to an embodiment, where depending on whether 'is_training' is enabled, either the values get dropped, or they just get passed through.

Autograd/Derivatives:

AI frameworks and scientific compute frameworks enable to automatically compute gradients for given computation graphs. To differentiate loop primitives, they need to be reversed, so that the last iteration of the forward pass is executed first within the backward pass. This requires that either the condition can be reversed (e.g., if the condition is just a counter), or it is necessary to recall the number of iterations from the forward pass. To differentiate If constructs, it is necessary to recall if it was executed during the forward pass. So far, the %4_host was allocated as register. This does not work if there are separate function calls for the forward and backward pass. Two solutions which are advantageously relatively easy to implement are:

1. To either store the input '%4' of 'copy<src_device, dst_device>(%4)' as a copy within the execution context and repeat the copy during the backward pass.
2. To explicitly store '%4_host' within the execution context.

Cross-Control-Flow-Layer Fusion

Figure 6:
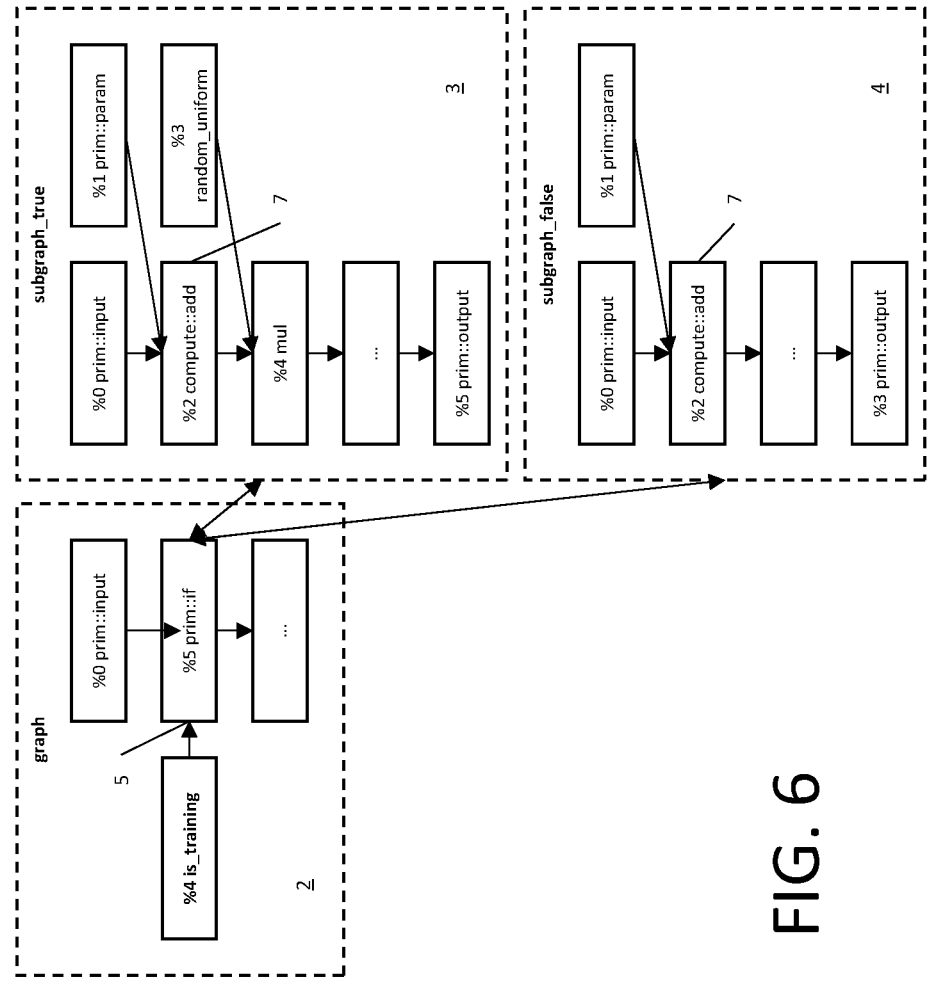
FIG. 6 illustrates a Cross-Control-Flow-Layer Fusion example, that moved element-wise operations in both subgraphs, enabling layer-fusion within the subgraphs according to an embodiment.

Embodiments of the present invention provide to enable/disable BatchNorm or Dropout layers. However, such dynamism can prevent specific performance-critical optimizations, as optimizations such as layer fusion cannot be applied across the boundaries of sub-graphs (see the example in FIG. 5). Compilers may make heavy use of fusion of layers. However, the control-flow primitive 'prim::if' 5 prevents to apply layer fusion for the 'subgraph_true' case. Further, within the 'subgraph_false' case, data is unnecessarily copied from %0 to %1, as the main graph cannot know that the underlying subgraph does not do any computations. Therefore, as shown in FIG. 6, an embodiment of the present invention provides for moving fusable operations that occur before and after the control flow primitive into the subgraphs, to advantageously enable normal compiler layer fusion algorithms. Here, for example, layer node 7 ('%2 compute:add' from FIG. 5) has been moved into each of sub-graphs 3, 4. Although there are duplicates of the operations within the sub-graphs 3, 4, the execution time is not affected, because only one of the sub-graphs 3, 4 get executed, therefore the '%2 compute:add' is only executed once.

Dynamic Algorithm/Implementation Selection:

Depending on the input data, tensor shape or memory layout, different algorithms and implementations can yield superior performance. In existing compilers, heuristics and auto-tuning are used to statically determine optimal algorithms and implementations. However, many data properties are only known at runtime, e.g., the size of dynamic dimensions, data values or value ranges. Embodiments of the present invention allow for the use of simple metrics at runtime that check for these properties and select algorithms or shortcuts that work optimally for the given data properties. This includes selection of optimal numerical solving algorithms that are specialized for the given value ranges to provide more precise results or faster convergence. Also, shortcuts are possible, e.g., when the input tensor of a matrix multiplication is all zeroes, it is not needed to execute a computationally expensive '$O(n^3)$' complexity (naïve implementation) matrix multiplication; instead, one can just initialize a tensor with all values equal zero, which only requires '$O(n)$'. This saves computational resources and/or increases compute speed.

Parameter and Compute-Once Path Selection:

In computation graphs, not all layers depend on input tensors. For example, in frameworks using OneDNN (legacy name MKLDNN), the memory layout of the weights of convolutions needs to be converted into a blocked-memory layout to better utilize the vector instructions. In existing frameworks, either the data needs to be converted every time the model is executed, or manually converted by the user (e.g., 'tensor=tensor.to_mkldnn( )'). Another example are the weights for Recurrent Neural Network (RNN) layers in the CUDA Deep Neural Network (CUDNN) that need to be converted into a specific layout optimized for the GPU processing. As these only depend on the model parameters, these layers only need to be executed whenever the parameters have changed. Thus, it's possible to preprocess these once and keep a copy of the last layer's that does not depend on the model input tensors. For additional information, reference is made to US Application Publication No. 2023/0120516, which is hereby incorporated by reference herein, which discusses splitting the models into multiple compilation targets, one for preprocessing, depending only on model parameters, and one for the main processing that uses the output of the preprocessing and the model input data.

Figure 7:
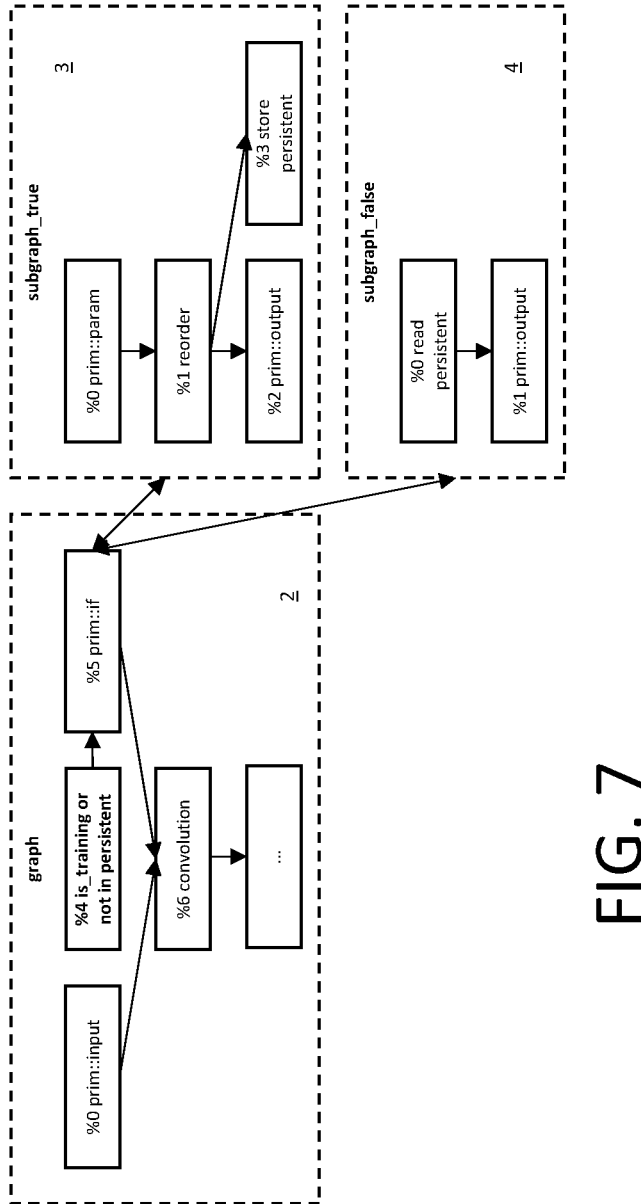
FIG. 7 illustrates an example of dynamic pathway for parameter preprocessing according to an embodiment.

With an embodiment of the present invention, as shown in FIG. 7, it is possible to automatically detect these code paths in a single compilation target and enable to dynamically execute them whenever parameters have changed. For example, this can be detected by a "dirty flag" within the tensors, indicating that the content has changed, or systematically. Only in training mode, parameters get updated, such as mean and var parameters of BatchNormalizations, or all parameters that get updated through gradient descent. This information is available to the model and can easily be used to enable/disable corresponding execution paths within the compiled model.

In FIG. 7, the code translates to:

```
def func(input):
    if self.is_training or not hasattr(self, 'params_persistent'):
        params = reorder(self.param)
        self.params_persistent = params
    else:
        params = self.params_persistent
    return convolution(input, params)
```

Many convolution algorithms work best if the parameters are stored in a way that enable efficient memory access patterns. However, for this it may be necessary to reorder the data within the memory which takes time. During training, the parameters get constantly updated, so this reordering need to be redone over and over again. However, in the present embodiments, once the model is trained, and prediction is done, the reordering does not need to be done again and again; instead a copy of the reordered may be stored as "persistent", and then the reordered parameters are reused, instead of over and over re-computing the reordering.

Embodiments of the present invention provide improvements over existing technology. For example, Torch.Compile/Triton Compile <<https://triton-lang.org>>, in contrast to embodiments of the present invention, does not provide any control flow primitives and no dynamic shape support (for further discussion of technical limitations, see William Wen, "Torch.Compile Tutorial," The Linux Foundation, <<https://pytorch.org/tutorials/intermediate/torch_compile_tutorial.html>> (accessed Aug. 3, 2023), which is hereby incorporated by reference herein). Apache TVM <<https://tvm.apache.org>> and TensorRT <<https://developer.nvidia.com/tensorrt>> likewise do not provide any control flow primitives, and also have no use for control flow primitives because they aim for inference only, so there is no need for dynamism within their computation graphs. OpenXLA <<https://github.com/openxla/xla>>, which was previously part of TensorFlow, likewise merely aims for training support and does not provide for dynamism such as that provided for by embodiments of the present invention (for further discussion of limitations, see Milad Mohammadi, Jack Cao, Shauheen Zahirazami, Joe Spisak, and Jiewen Tan, "PyTorch & OpenXLA: The Path Forward," The Linux Foundation, <<https://pytorch.org/blog/pytorch-2.0-xla-path-forward/>> (Apr. 3, 2023), which is hereby incorporated by reference herein). OpenVINO <<https://docs.openvino.ai>>, like the other existing technology, does not provide any control flow primitives and has only basic support for dynamic shapes. Johnathan Raiman, "Dali: Lazy Compilation of Dynamic Computation Graphs," OpenAI, <<http://learningsys.org/nips18/assets/papers/100CameraReadySubmissionDali_Lazy_Compilation_of_Dynamic_Computation_Graphs.pdf>> (accessed Aug. 3, 2023) describe the tool referred to as Dali, which is not a compiler, but merely records the execution graph lazily, applies obvious optimizations at runtime (e.g., 'matmul (constant(0), param)→constant(0)') and then executes the graph using a runtime engine, similar to the eager/graph engines of Pytorch/TensorFlow. Thus, the author there uses the term "dynamic" differently, and merely describes to observe the eager execution of a model without directly executing it.

Embodiments of the present invention can be applied to improve AI and ML frameworks and platforms, and can be further applied to a very wide area of applications and use cases to effect further improvements in many technical fields. In general, embodiments of the present invention can be practically applied to any application that nowadays can be implemented using popular frameworks including, but not limited to, PyTorch, TensorFlow, Numpy, JAX, Scikit-Learn, from various application domains including, but not limited to machine learning, medicine and healthcare (e.g., AI assisted healthcare or drug development), computational biology, chemistry, physics, electrical- or mechanical-engineering for improved optimization of targets.

In an embodiment, the present invention provides a method for dynamic control flow in compiled tensor computation graphs, the method comprising one or more of the steps of:

1) Implementing dynamic control flow primitives in compiled control-plane of compiled graphs. (#1)
2) Detection of Zero-Element-Tensors and adding early termination paths. (#2)
3) Moving fusable layers into subgraphs of control-flow. (#3)
4) Dynamic enabling/disabling of code paths, depending on user/application defined external parameters and runtime data properties. (#4)

Embodiments of the present invention provide for the following improvements over existing technology:

1. Providing dynamic control flow primitives for compiled tensor computation graphs for accelerator-based execution targets by extending the control-plane of the compiled library with the capabilities to select different code paths (subgraphs) depending on runtime information.
2. Providing for automatic early termination for zero-element-tensor runtime cases.
3. Enabling computation graph optimizations beyond control-flow boundaries, by duplicating layers into subgraphs, to enable more layer fusion within the subgraphs.
4. Providing dynamic implementation/algorithm selection based on runtime data properties within compiled tensor computation graphs.
5. Enabling a high level of dynamism within compiled AI and tensor computation graphs. In contrast, existing compilers require to recompile the entire graph whenever anything is changed by the user, e.g., the executing device, enabling/disabling of layers such as BatchNorm or Dropout layers, or enabling/disabling of required gradient outputs.
6. Improving computational performance of eager- or graph-mode execution engines, which can react dynamically to changing gradient output requirements, but suffer from overall lower performance because they cannot utilize layer fusion.

Figure 8:
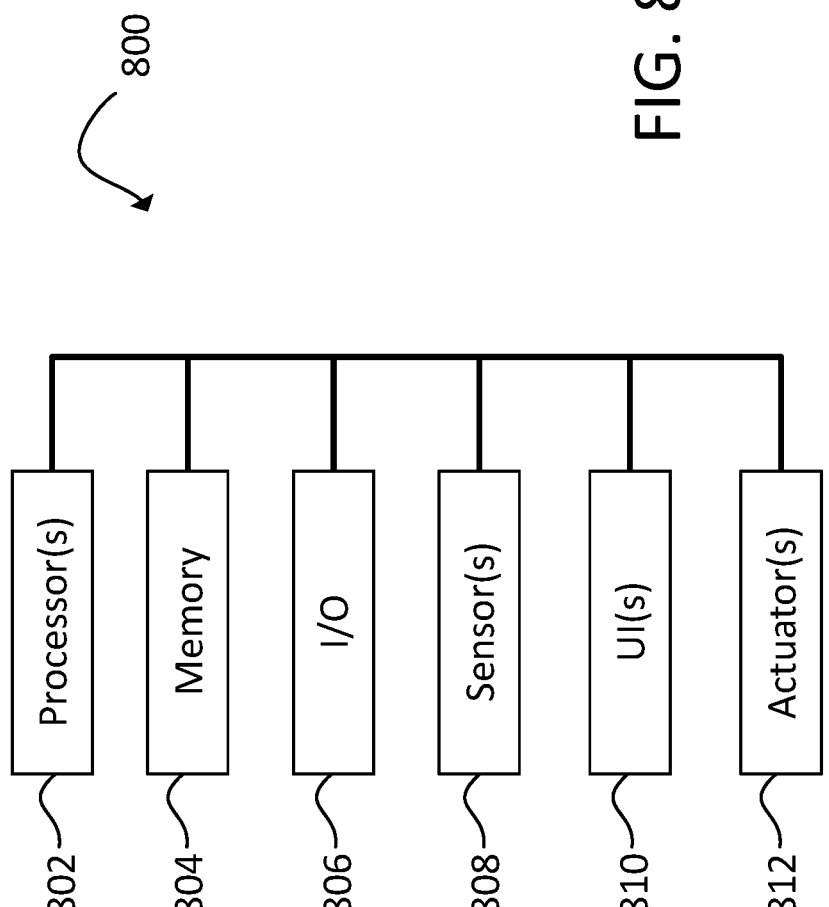
FIG. 8 is a block diagram of an exemplary processing system according to an embodiment, which can be configured to perform any and all operations disclosed herein.

Referring to FIG. 8, a processing system 800 can include one or more processors 802, memory 804, one or more input/output devices 806, one or more sensors 808, one or more user interfaces 810, and one or more actuators 812. Processing system 800 can be representative of each computing system disclosed herein.

Processors 802 can include one or more distinct processors, each having one or more cores. Each of the distinct processors can have the same or different structure. Processors 802 can include one or more central processing units (CPUs), one or more graphics processing units (GPUs), circuitry (e.g., application specific integrated circuits (ASICs)), digital signal processors (DSPs), and the like. Processors 802 can be mounted to a common substrate or to multiple different substrates.

Processors 802 are configured to perform a certain function, method, or operation (e.g., are configured to provide for performance of a function, method, or operation) at least when one of the one or more of the distinct processors is capable of performing operations embodying the function, method, or operation. Processors 802 can perform operations embodying the function, method, or operation by, for example, executing code (e.g., interpreting scripts) stored on memory 804 and/or trafficking data through one or more ASICs. Processors 802, and thus processing system 800, can be configured to perform, automatically, any and all functions, methods, and operations disclosed herein. Therefore, processing system 800 can be configured to implement any of (e.g., all of) the protocols, devices, mechanisms, systems, and methods described herein.

For example, when the present disclosure states that a method or device performs task "X" (or that task "X" is performed), such a statement should be understood to disclose that processing system 800 can be configured to perform task "X". Processing system 800 is configured to perform a function, method, or operation at least when processors 802 are configured to do the same.

Memory 804 can include volatile memory, non-volatile memory, and any other medium capable of storing data. Each of the volatile memory, non-volatile memory, and any other type of memory can include multiple different memory devices, located at multiple distinct locations and each having a different structure. Memory 804 can include remotely hosted (e.g., cloud) storage.

Examples of memory 804 include a non-transitory computer-readable media such as RAM, ROM, flash memory, EEPROM, any kind of optical storage disk such as a DVD, a Blu-Ray® disc, magnetic storage, holographic storage, a HDD, a SSD, any medium that can be used to store program code in the form of instructions or data structures, and the like. Any and all of the methods, functions, and operations described herein can be fully embodied in the form of tangible and/or non-transitory machine-readable code (e.g., interpretable scripts) saved in memory 804.

Input-output devices 806 can include any component for trafficking data such as ports, antennas (i.e., transceivers), printed conductive paths, and the like. Input-output devices 806 can enable wired communication via USB®, DisplayPort®, HDMI®, Ethernet, and the like. Input-output devices 806 can enable electronic, optical, magnetic, and holographic, communication with suitable memory 806. Input-output devices 806 can enable wireless communication via WiFi®, Bluetooth®, cellular (e.g., LTE®, CDMA®, GSM®, WiMax®, NFC®), GPS, and the like. Input-output devices 806 can include wired and/or wireless communication pathways.

Sensors 808 can capture physical measurements of environment and report the same to processors 802. User interface 810 can include displays, physical buttons, speakers, microphones, keyboards, and the like. Actuators 812 can enable processors 802 to control mechanical forces.

Processing system 800 can be distributed. For example, some components of processing system 800 can reside in a remote hosted network service (e.g., a cloud computing environment) while other components of processing system 800 can reside in a local computing system. Processing system 800 can have a modular design where certain modules include a plurality of the features/functions shown in FIG. 8. For example, I/O modules can include volatile memory and one or more processors. As another example, individual processor modules can include read-only-memory and/or local caches.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer-implemented for optimizing control flow in compiled computation graphs, the method comprising:

defining an intermediate representation (IR) of a computation graph, the computation graph IR including a main computation graph having at least one control flow primitive layer node pointing to one or more control flow conditional-graph nodes;

identifying fusable layer nodes of the main computation graph; and removing the fusable layer nodes from the main computation graph and duplicating the removed fusable layer nodes into each of the one or more control flow conditional-graph nodes.

2. The method of claim 1, wherein layer nodes of the computation graph IR define code paths, and wherein the method further comprises, during runtime:

detecting one or more code paths that depend on one or more parameters that may change; and enabling or disabling executing the one or more code paths based on the one or more parameters having changed during runtime.

3. The method of claim 1, further comprising copying to a memory a computation result of a layer node of the main computation graph executed prior to the at least one control flow primitive layer node.

4. The method of claim 1, wherein only a layer node that receives data or calls for data is configured to allocate or free memory for the data and for variables.

5. The method of claim 4, wherein each of the one or more control flow conditional-graph nodes is allowed to only allocate memory for itself.

6. The method of claim 1, further comprising adding a termination path sub-graph node that provides for all model outputs of the termination path sub-graph to be allocated and/or zeroed out, wherein the termination path sub-graph is executed at runtime in response to a zero-element tensor.

7. The method of claim 1, wherein the fusible layer nodes comprise operations that occur before and/or after execution of the at least one control flow primitive layer node.

8. The method of claim 1, wherein the defining the IR of the computation graph includes receiving the computation graph and processing the computation graph to produce the IR of the computation graph.

9. The method of claim 1, wherein the at least one control flow primitive layer node comprises a conditional construct.

10. The method of claim 9, wherein the conditional construct comprises a While construct or an If construct or a loop construct.

11. The method of claim 9, wherein the one or more control flow conditional-graph nodes comprises a first conditional-graph node and a second conditional-graph node, wherein the conditional construct is associated with the first conditional-graph node and the second conditional-graph node, and wherein only one of the first conditional-graph node or the second conditional-graph node is executed during runtime based on a dynamic runtime condition.

12. The method of claim 11, wherein the conditional construct is an If construct, and wherein the first conditional-graph node is associated with a true condition of the If construct and the second conditional-graph node is associated with a false condition of the if construct.

13. The method of claim 1, wherein the main computation graph comprises the at least one control flow primitive layer node and a plurality of non-control flow primitive layer nodes, and wherein each of the identified fusable layer nodes is a non-control flow primitive layer node from the plurality of non-control flow primitive layer nodes.

14. The method of claim 13, wherein identifying the fusable layer nodes of the main computation graph is based on analyzing the plurality of non-control flow primitive layer nodes that occur before or after each of the at least one control flow primitive layer node.

15. A system for optimizing control flow in compiled computation graphs, the system comprising one or more hardware processors which, alone or in combination, are configured to provide for execution of the following steps:

defining an intermediate representation (IR) of a computation graph, the computation graph IR including a main computation graph having at least one control flow primitive layer node pointing to one or more control flow conditional-graph nodes;

identifying fusable layer nodes of the main computation graph; and removing the fusable layer nodes from the main computation graph and duplicating the removed fusable layer nodes into each of the one or more control flow conditional-graph nodes.

16. The system of claim 15, wherein the steps further include adding a termination path sub-graph node that provides for all model outputs of the termination path sub-graph to be allocated and/or zeroed out, wherein the termination path sub-graph is executed at runtime in response to a zero-element tensor.

17. The system of claim 15, wherein the steps further include copying to a memory a computation result of a layer node of the main computation graph executed prior to the at least one control flow primitive layer node.

18. The system of claim 15, wherein layer nodes of the computation graph IR define code paths, and wherein the steps further include, during runtime:

detecting one or more code paths that depend on one or more parameters that may change; and enabling or disabling executing the one or more code paths based on the one or more parameters having changed during runtime.

19. A tangible, non-transitory computer-readable medium having instructions thereon which, upon being executed by one or more hardware processors, alone or in combination, provide for execution of the following steps:

defining an intermediate representation (IR) of a computation graph, the computation graph IR including a main computation graph having at least one control flow primitive layer node pointing to one or more control flow conditional-graph nodes;

identifying fusable layer nodes of the main computation graph; and removing the fusable layer nodes from the main computation graph and duplicating the removed fusable layer nodes into each of the one or more control flow conditional-graph nodes.

* * * * *